United States Patent
Bigand et al.

(10) Patent No.: US 9,836,140 B2
(45) Date of Patent: Dec. 5, 2017

(54) DATA INPUT DEVICE AND ASSOCIATED BRAKING MEANS

(71) Applicant: THALES, Courbevoie (FR)

(72) Inventors: Jean-Louis Bigand, Vendome (FR); Michael Manceau, Chateaudun (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/855,162

(22) Filed: Sep. 15, 2015

(65) Prior Publication Data
US 2016/0077614 A1    Mar. 17, 2016

(30) Foreign Application Priority Data
Sep. 17, 2014   (FR) .................................... 14 02082

(51) Int. Cl.
*G06F 3/033* (2013.01)
*G06F 3/0354* (2013.01)
*F16D 49/10* (2006.01)
*G06F 3/038* (2013.01)
*G06F 3/0362* (2013.01)

(52) U.S. Cl.
CPC ......... *G06F 3/03549* (2013.01); *F16D 49/10* (2013.01); *G06F 3/038* (2013.01); *G06F 3/0362* (2013.01)

(58) Field of Classification Search
CPC ............. G06F 3/03594; G06F 3/03541; G06F 3/0362; G06F 3/038; F16D 49/10
USPC ........................................................ 345/158
See application file for complete search history.

(56) References Cited

U.S. PATENT DOCUMENTS

| | | | | |
|---|---|---|---|---|
| 2,689,141 A | * | 9/1954 | Kiekhaefer | F16L 23/06 24/279 |
| 3,483,888 A | * | 12/1969 | Wurzel | F16K 1/14 137/539 |
| 3,643,148 A | * | 2/1972 | Brown | G01S 13/66 244/236 |
| 3,801,141 A | * | 4/1974 | Hollingsworth | F16L 25/14 285/236 |
| 4,464,652 A | * | 8/1984 | Lapson | G06F 3/0312 345/165 |
| 5,187,468 A | * | 2/1993 | Garthwaite | B28B 13/04 345/167 |

(Continued)

FOREIGN PATENT DOCUMENTS

| EP | 1 739 531 A1 | 1/2007 |
|---|---|---|
| EP | 2 607 992 A2 | 6/2013 |

(Continued)

*Primary Examiner* — Benyam Ketema
(74) *Attorney, Agent, or Firm* — Baker & Hostetler LLP

(57) ABSTRACT

A data input device comprises a body intended to be fixed onto a workstation, a part that is rotationally mobile in relation to the body, a set of sensors delivering information on the relative position of the mobile part in relation to the body and means for braking the rotational movements of the mobile part in relation to the body. The braking means comprise a friction ring encircling the mobile part, the ring being split and extending mainly in a plane at right angles to an axis of symmetry of the mobile part, an annular spring extending in the plane and radially compressing the friction ring against the mobile part and means for adjusting the length of the annular spring.

9 Claims, 3 Drawing Sheets

(56) References Cited

U.S. PATENT DOCUMENTS

| | | | | |
|---|---|---|---|---|
| 5,504,500 | A * | 4/1996 | Garthwaite | G06F 1/1632 345/157 |
| 5,658,021 | A * | 8/1997 | Matsumoto | F16L 17/04 285/112 |
| 6,084,574 | A * | 7/2000 | Bidiville | G06F 3/0312 345/163 |
| 6,158,781 | A * | 12/2000 | Aaron, III | F16L 27/053 285/23 |
| 6,222,525 | B1 * | 4/2001 | Armstrong | G06F 3/0213 345/161 |
| 6,408,798 | B1 * | 6/2002 | Damme | A01K 1/0035 119/482 |
| 6,497,120 | B1 * | 12/2002 | Kozora | C03B 9/1932 29/428 |
| 6,581,492 | B1 * | 6/2003 | Chen | B62K 3/002 16/900 |
| 6,707,443 | B2 * | 3/2004 | Bruneau | A63F 13/06 345/156 |
| 7,286,114 | B2 * | 10/2007 | Lee | G06F 3/03543 345/156 |
| 9,239,634 | B2 * | 1/2016 | Laso-Leon | G06F 3/033 |
| 2001/0047571 | A1 * | 12/2001 | Richter | F16L 23/06 24/273 |
| 2002/0121155 | A1 * | 9/2002 | Wu | B62K 3/002 74/551.7 |
| 2003/0142069 | A1 * | 7/2003 | Gatto, Jr. | G06F 3/03549 345/156 |
| 2004/0160414 | A1 * | 8/2004 | Armstrong | G06F 3/0338 345/156 |
| 2007/0163422 | A1 * | 7/2007 | Rogers | G10D 13/029 84/411 R |
| 2008/0168799 | A1 * | 7/2008 | Fogel | A44C 9/00 63/15 |
| 2011/0134042 | A1 * | 6/2011 | Rayner | G06F 1/26 345/167 |
| 2013/0154936 | A1 | 6/2013 | Laso-Leon et al. | |
| 2014/0002362 | A1 * | 1/2014 | Srivastava | G06F 3/03549 345/167 |

FOREIGN PATENT DOCUMENTS

| | | |
|---|---|---|
| JP | 2009-128963 A | 6/2009 |
| WO | 2004/038575 A2 | 5/2004 |
| WO | 2009/023395 A1 | 2/2009 |

* cited by examiner

DATA INPUT DEVICE AND ASSOCIATED BRAKING MEANS

CROSS-REFERENCE TO RELATED APPLICATION

This application claims priority to foreign French patent application No. FR 1402082, filed on Sep. 17, 2014, the disclosure of which is incorporated by reference in its entirety.

FIELD OF THE INVENTION

The invention relates to a data input device used to input continuous or pseudo-continuous data, such as, for example, pointing to objects on a screen of a computer system. Known devices generally comprise a body intended to be fixed onto a workstation and a part that is mobile in relation to the body. Sensors make it possible to deliver information representative of the position of the mobile part in relation to the body. The information can be associated with a position on the screen by means of a system computer. Interest is more particularly focused on the data input devices that have a part that is rotationally mobile in relation to the body.

BACKGROUND

For example, a coder or a potentiometer has a shaft that is rotationally mobile about an axis in relation to the body. The sensors make it possible to define the angular position of the shaft about its axis of rotation in relation to the body. An operator turns the shaft about its axis by means of a button secured to the shaft. The rotation of the shaft makes it possible for the operator to select a datum from a range. The range may be continuous and the selection is for example made by means of an analog potentiometer. The range may comprise a series of discrete values and the selection may be made by means of a coder, the rotation of the shaft making it possible to increment the values according to the pitch of the coder.

Other data input devices, such as a track ball, have a part that is mobile according to two rotational degrees of freedom. The mobile part is a sphere. The sensors deliver information on the position of the sphere according to the two degrees of freedom. The track ball can be used to point to an object on the surface of a screen. Each of the two rotations of the sphere is associated with a translation on the surface of the screen. In other words, a track ball can be used to point to objects on a screen of a computer system. An operator moves the sphere with the fingers to reach a desired position on the screen and thus point to an object displayed on the screen.

The invention is of particular use for data input devices belonging to equipment mounted onboard an aircraft. The data input device can then be used to select flight parameters displayed on the screen of the system, the selection being able to be made in the form of a choice of a value from a series by means of a coder or of a potentiometer or by pointing to an object displayed on a screen.

The aircraft may be subject to turbulences which risk disrupting pointing to the objects. More specifically, the turbulences generate vibrations that can result in uncontrolled movements of the mobile part. Even in the absence of established turbulences, slight acceleration phenomena affecting the equipment prevent the crew members from pointing to a graphic zone with any more than a certain level of precision.

For the track ball, a usual solution to this problem consists in overdimensioning on the screen the objects that can be picked so as to take account of this limitation. Consequently, this reduces the number of objects that can be displayed on a given display surface area.

Attempts have also been made to stabilize the hand of the operator by creating suitable bearing surfaces. An example is given in the patent application published under the number EP 1 552 376 in which the fixed part of a track ball has an ergonomic form intended to receive the palm of the operator, hence its name of "palm rest". Nevertheless, such a palm rest does not make it possible to completely stabilize the sphere through the fingers of the operator.

These two solutions are often associated with sphere braking means. These means make it possible to limit the uncontrolled movements of the sphere in the case of vibrations.

The brake is naturally secured to the fixed part of the track ball and exerts a load on the sphere for example by means of a skid rubbing against the sphere. In the displacements of the sphere, the bearing of the skid generates a friction torque opposing the rotations of the sphere. The skid is kept pressed against the sphere by means of a spring bearing against the fixed part.

Assuming that the sphere is accessible to the fingers of the operator from above, one solution already implemented consists in positioning a surface rubbing on the ball above the plane of symmetry of the sphere. The rubbing surface is generally produced by a membrane made of plastic material. The force exerted along the vertical axis of the sphere by the rubbing surface is produced by an elastomer or a spring system pressing on the rubbing surface.

This arrangement causes many problems. The surface area that can be used by the operator is reduced because of the presence of the rubbing surface above the plane of symmetry of the sphere.

The friction torque generated by the brake is greatly dependent on the accuracy of coaxial alignment between the vertical axis of the sphere and the axis of the friction surface. The sphere is generally placed on pivots forming sensors that make it possible to deliver information on the position of the sphere in relation to the fixed part. The separation between the axes of the sphere and of the brake depends on a chain of dimensions involving numerous mechanical parts. The accuracy of coaxial alignment requires precise assemblies and machinings.

The friction torque generated depends on the pressure exerted by the elastic device which in turn depends on the vertical position of the sphere. To limit this dependency, it may be necessary to provide means for adjusting the brake vertically. This solution is costly because the adjustment means have to be set individually for each track ball.

The torque generated also varies greatly as a function of the variations of the diameter of the sphere, particularly upon temperature variations, causing it to rise against the braking device when being used at high temperature or to drop when being used at low temperature.

It has been found that the brake is particularly fragile to use outside of its normal position of use such as when turned over during transportation.

Moreover, the friction torque is set when the track ball is mounted. To modify this setting, it is necessary to dismantle the brake, which is difficult to accept in the aeronautical field.

Conventional brakes exhibit dry frictions. In other words, a non-zero break-away torque is necessary to set the mobile part of the track ball in motion. The break-away torque has to be as weak as possible to allow for accurate pointing on the screen. It must not be too weak for the ball to be set in motion alone and move the cursor on the screen in use in a vibratory environment.

Furthermore, when the mobile part is in motion, after it has broken away, the friction torque must not be too high to remain comfortable for the operator. The range of torques acceptable to an operator is relatively low.

Many conditions of use cause the friction torque to change such as, for example, fat from the fingers of the operator or dust deposited on the sphere, differential expansions as a function of the temperature variations of the mechanical parts that make up the track ball, the relaxation of the braking device, the wear of the braking device, etc.

The friction and break-away torques are greatly variable. Their control requires a perfect knowledge of the impacts of each factor of degradation of these torques to best position the torque value at the time of the delivery of the track ball to take account of the variations over time.

Finally, each operator has a perception of these torques and their operational impact. Some operators prefer a higher torque for a fine adjustment, others prefer a weak torque for rough but rapid adjustments to the cost of fine adjustment. The braking torque cannot be personalized in operation by the operator without dismantling the braking device and readjusting.

In the current solutions, all these constraints are taken into account to deliver a track ball set with precise break-away and friction torques that lie within a narrow tolerance. This adjustment is made by successive iterations before the delivery of the equipment. It is repeated regularly in operation when the operator feels that the torque is no longer satisfactory for suitable use.

SUMMARY OF THE INVENTION

The invention aims to mitigate all or some of the problems cited above by proposing a data input device that has a brake that is much more tolerant to dimensional variations of the different mechanical parts that make up the track ball and that can be adjusted easily by an operator when using the device.

To this end, the subject of the invention is a data input device comprising a body intended to be fixed onto a workstation, a part that is rotationally mobile in relation to the body, a set of sensors delivering information on the relative position of the mobile part in relation to the body and means for braking the rotational movements of the mobile part in relation to the body, characterized in that the braking means comprise a friction ring encircling the mobile part, the ring being split and extending mainly in a plane at right angles to an axis of symmetry of the mobile part, an annular spring extending in the plane and radially compressing the friction ring against the mobile part and means for adjusting the length of the annular spring.

In addition to the adjustment of the brake according to the constraints stated previously, the adjustment of the brake in operation can be done by the operator according to the vibratory conditions encountered. Onboard an aircraft, when turbulences occur, the operator can tighten the brake to avoid unwanted displacements of a cursor associated with the device. When the turbulences disappear, the operator can loosen the brake to improve the accuracy of the input applied by the device.

BRIEF DESCRIPTION OF THE DRAWINGS

The invention will be better understood and other advantages will become apparent on reading the detailed description of embodiments given by way of example, the description being illustrated by the attached drawing in which.

For clarity, the same elements will bear the same references in the different figures.

DETAILED DESCRIPTION

The invention can be implemented in different types of data input devices that have a mobile part intended to turn in relation to a fixed body. The mobile part can have two degrees of rotational freedom such as, for example, in a track ball, or just one degree of rotational freedom such as, for example, in a potentiometer or a rotary coder.

Figure 1:
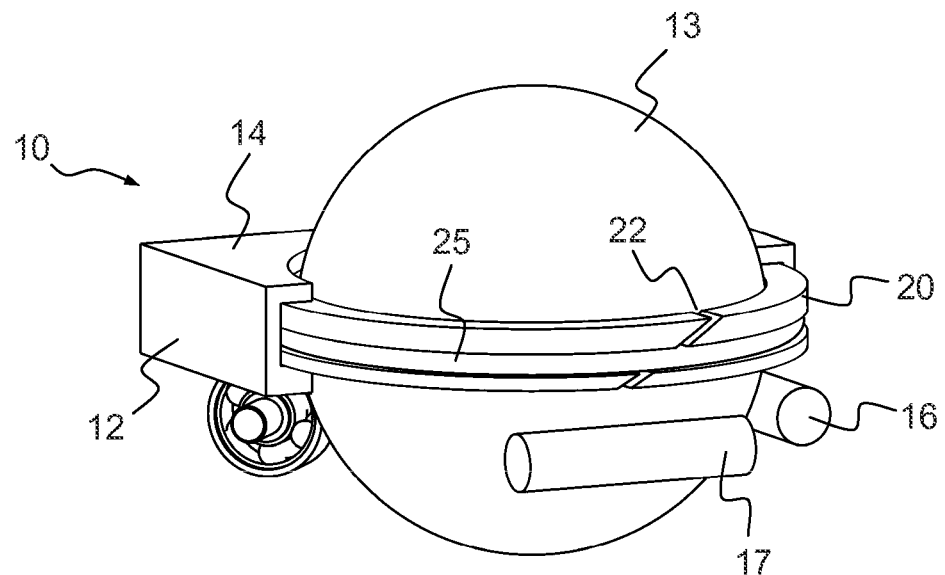
FIG. 1 shows a perspective view of a track ball.

FIG. 1 shows a perspective view of a track ball 10 intended to be actuated by the hand of an operator. The track ball 10 comprises a fixed body 12 and a sphere 13 that the operator can turn in relation to the fixed body 12. The sphere 13 forms the mobile part of the data input device. In the example represented, the fixed body 12 comprises a plate 14 intended to be fixed onto a workstation, such as, for example, an aircraft instrument panel. The track ball 10 comprises a set of sensors delivering information on the relative position of the sphere 13 in relation to the fixed body 12.

Figure 2:
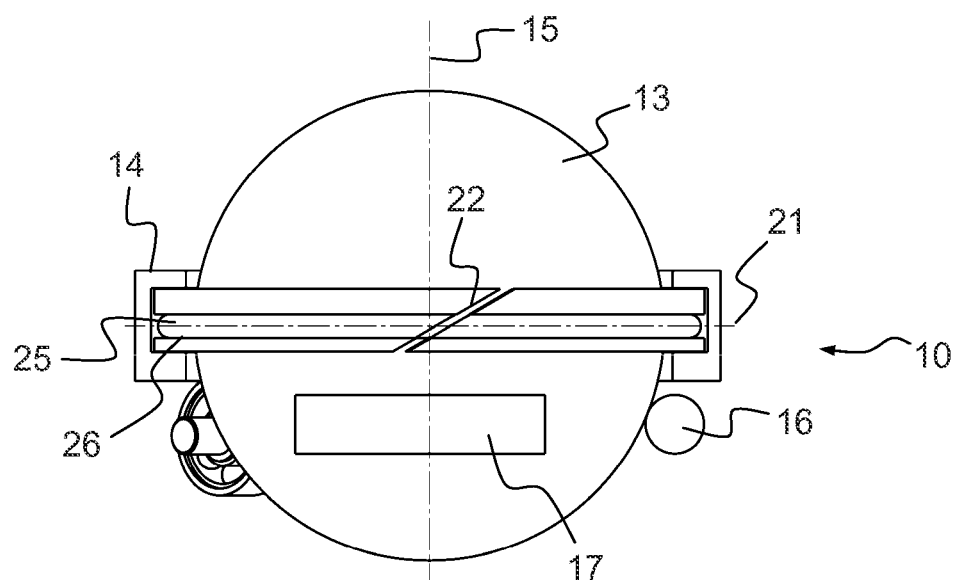
FIG. 2 shows a front view of the track ball.

FIG. 2 shows a front view of the track ball 10. This view is at right angles to the plate 14. The workstation in which the track ball 10 is installed can be formed by a horizontal work plane in the vicinity of the track ball 10. The plate 14 is then also horizontal. The sphere 13 comprises an emergent part above the plate 14. This is the part of the sphere that the operator maneuvers with his or her fingers. The set of sensors is situated under the plate 14 inside the fixed body 12. A track ball 10 implementing the invention can of course be positioned on an inclined work plane. An axis 15 of symmetry of the sphere 13 is defined, the axis 15 being at right angles to the plate 14. The axis 15 is vertical if the plane of the plate 14 is horizontal.

The set of sensors comprises, for example, two rollers 16 and 17 rolling without friction against the sphere 13 and each making it possible to know the angular position of the sphere 13 about axes parallel to the plane of the plate 14. The rollers 16 and 17 are for example each fixed to the rotor of an angular coder delivering the relative position information of the sphere 13. Other types of sensors can be used, such as, for example, optical or magnetic sensors sensitive to the movements of the sphere 13. The information from the set of sensors is transmitted to a computer that can belong to the track ball 10 or be remote therefrom. The computer is configured to decode the information received from the angular coders associated with the rollers 16 and 17. The computer sends, for example, the decoded information to the core of a computer system comprising a screen on which a pointer can move as a function of the information.

When the environment in which the track ball is installed can be subject to vibrations, the latter can cause uncontrolled movements of the sphere 13. To limit these movements, the track ball comprises means for braking the rotational movements of the sphere 13 in relation to the body 12. According to the invention, the braking means comprise a friction ring 20 encircling the sphere 13. The friction of the ring 20 against the sphere 13 generates a resisting torque making it possible to slow down the rotational movements of the sphere 13 on itself.

The ring extends primarily in a plane 21 at right angles to the axis 15, that is to say parallel to the plate 14. The ring 20 has a circular ring form in the plane 21. In practice, the ring 20 has a certain thickness at right angles to the plane 21. The thickness of the ring 20 is significantly less than the diameter of the ring 20 in the plane 21. Over its entire diameter, the ring contains the plane 21.

The sphere 13 is placed on the rollers 16 and 17. In order to relax the chain of dimensions linking the sphere 13 to the braking means, the ring 20 is translationally free in relation to the body 12 in the plane 21. In other words, the ring 20 has two degrees of translational freedom in the plane 21. These two degrees of freedom combined with the friction of the ring 20 against the surface of the sphere 13 make it possible for the ring 20 to automatically center its diameter on the sphere 13 and more specifically on its axis 15.

Advantageously, the plane 21 in which the ring 20 extends is a plane of symmetry of the sphere 13. In other words, the plane 21 cuts the sphere by a large diameter of the sphere 13. The ring 20 rubs on a diameter of the sphere 13. The fact of having the plane 21 at the level of a plane of symmetry of the sphere 13 makes it possible to maximize the surface area of the emergent part of the sphere 13 while ensuring that the sphere 13 is held in the fixed part 12 of the track ball.

Alternatively, the plane 21 can be arranged in such a way that the emergent part of the sphere 13 is smaller for reasons of installation in the workstation in which the track ball 10 is installed. It is also possible to increase the surface area of the emergent part of the sphere 13 beyond the plane of symmetry of the sphere 13.

The ring 20 is split. In other words, the ring 20 forms an open circular ring. A split 22 makes it possible to produce this opening and can be seen in the two FIGS. 1 and 2. The split gives the ring a certain elasticity allowing it to adapt to differences of diameter of the sphere 13. These differences are, for example, due to the manufacturing tolerances of the sphere 13 or even to thermal expansions of the sphere 13 during its use. The adaptation of the ring 20 also allows it to compensate for wear of its friction surface which necessarily occurs throughout the use of the track ball 10. The split 22 can be at right angles to the plane 21 or inclined as represented in the figures.

Two characteristics of the material of the ring 20 are used to allow it to fulfill its sphere 13 braking function. On the one hand, the elasticity of the ring 20 characterized by its dimensions and its Young's modulus allows it to ensure a clamping force on the sphere 13. On the other hand, the ring 20/sphere 13 friction coefficient allows it to quantify the friction torque associated with the clamping force.

It is possible to dissociate these two characteristics by adding an additional elastic element making it possible to ensure the clamping of the ring 20 against the sphere 13. To this end, the braking means advantageously comprise an annular spring 25 extending in the plane 21 and radially compressing the ring 20 against the sphere 13. The radial compression of the ring 20 makes it possible to simplify the production of the compression force. The spring 25 is arranged in the plane 21 of the ring 20 and therefore makes it possible to free up the space situated under the plane 21 in the track ball 10. The spring 25 can be arranged in a groove 26 produced in the ring 20.

The ring 20 is for example made of polytetrafluoroethylene (PTFE). This material has a Young's modulus that is too low to ensure a sufficient force of the ring on the sphere 13. For that, the clamping of the ring 20 on the sphere is obtained by means of a spring for example made of spring steel wire. Moreover, the polytetrafluoroethylene has a relatively low friction coefficient. This offers the advantage of reducing the sensation of dry friction and of break-away occurring when an operator begins moving the sphere.

Figure 3:
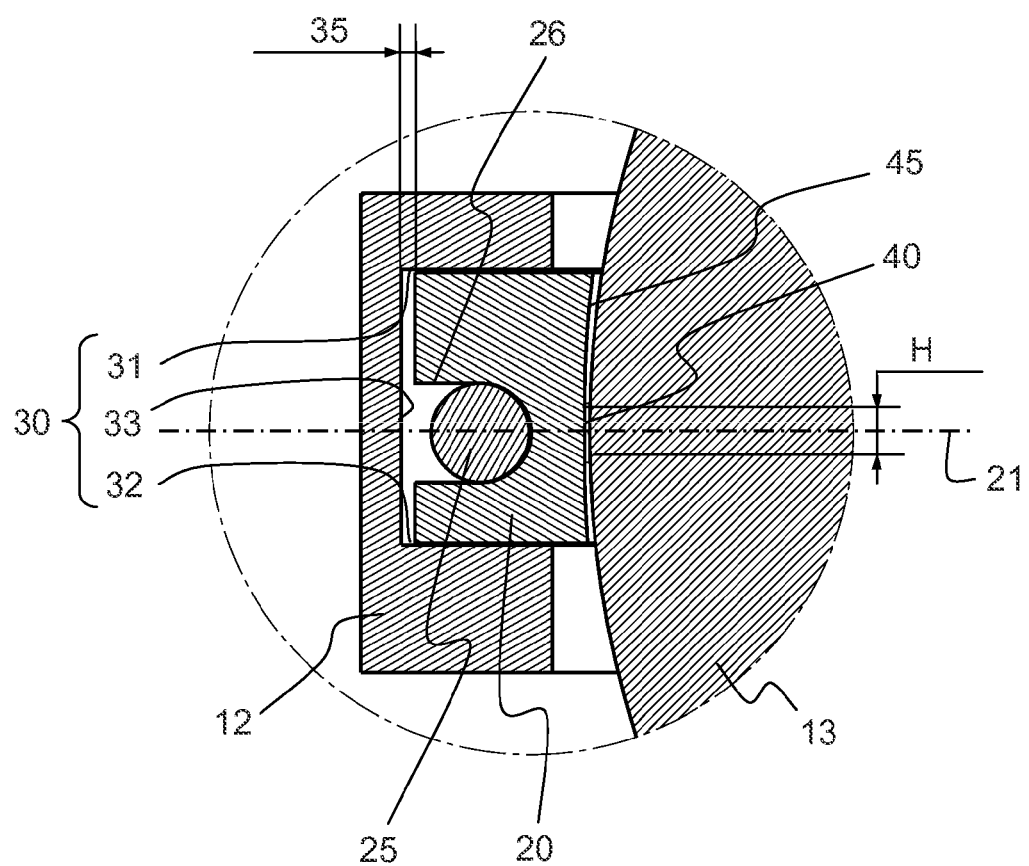
FIG. 3 shows a partial cross-sectional view of the track ball.

FIG. 3 shows a partial cross section of the link between the ring 20 and the body 12. In order to ensure the translational freedom of the ring 20 in relation to the body 12 in the plane 21, the body 12 comprises a groove 30 extending in the plane 21. Like the ring 20, the groove is annular and centered on the axis 15. The outer diameter of the ring 20 is less than the inner diameter of the groove 30.

In a radial plane about the axis 15, the groove has a constant section having primarily two flanks 31, 32 and a bottom 33. The flanks 31 and 32 are substantially parallel to the plane 21. The bottom 33 is substantially at right angles to the plane 21. The ring 20 is guided in translation between the two flanks 31 and 32. An additional play 35 is provided between the ring 20 and the bottom 33. The functional play 35 allows the translational freedom of the ring 20 in relation to the body 12. The value of the play 35 is chosen as a function of the positioning tolerances of the sphere 13 in relation to the body 12. The value of the play 35 is equal to the difference between the outer diameter of the ring 20 and the inner diameter of the groove 30. The functional play 35 also makes it possible to take account of dimensional variations of the sphere 13 upon temperature variations.

In practice, in order to insert the ring 20 into the body 12, the plate 14 can be made up of two half-plates fixed to one another after the ring 20 has been mounted. The groove 30 extends in the two half-plates. In FIGS. 1 and 2, only one of the half-plates is represented. The assembly of the ring 20 and of the two half-plates is done in two stages. First of all, the ring is inserted into a first of the two half-plates by a translational movement whose direction is borne by the plane 21. Then, the second half-plate is inserted, still by the same translational movement to close the groove 30 about the ring 20.

The ring 20 comprises a friction surface 40 intended to rub against the sphere 13 to slow down its rotational movements. The functional play 35 makes it possible to take up the differences of position of the sphere 13 in translation in the plane 21. It is also advantageous to provide means for taking up the differences of position of the sphere 13 at right angles to the plane 21. To this end, the friction surface 40 has a cylindrical form extending at right angles to the plane 21. In other words, the friction surface 40 forms a portion of cylinder of axis 15. The height H of the cylinder, measured along the axis 15, is defined as a function of the height variations of the plane 21, the plane of symmetry of the sphere 13 bearing a large diameter of the sphere 13. More generally, the cylindrical surface 40 is configured to allow a translational displacement of the sphere 13 at right angles to the plane 21.

Alternatively, the friction surface 40 can have a tapered form with a small aperture angle. The aperture angle is oriented in such a way as to generate a load of the sphere 13 toward the rollers 16 and 17 and thus press the sphere 13 against the rollers.

In FIG. 3, the friction surface 40 has been represented at a slight distance from the sphere 13. In operation, obviously the friction surface 40 is pressed against the sphere under the effect of the elasticity of the spring 25. This pressure generates the friction torque used for the braking of the sphere 13.

The sphere 13 is likely to separate from the two rollers 16 and 17, for example under the effect of significant vibrations in operation or during the transportation of the track ball 10 before its installation in its work plane. Such separation can lead to an extraction of the sphere 13 from its housing. To limit this risk, it is advantageous to provide means to limit the translation of the sphere 13 at right angles to the plane 21. In other words, the track ball 10 may comprise an abutment against which the sphere 13 can abut to prevent the sphere 13 from being able to be completely separated from the body 12. This abutment function is advantageously produced by the ring 20 itself which then has an abutment 45 suitable for limiting a translation of the sphere 13 at right angles to the plane 21.

To prevent the sphere 13 from jamming in the ring 20, the abutment 45 is advantageously a portion of spherical surface complementing that of the sphere 13 and lying in the extension of the friction surface 40 with no slope interruption. More specifically, the friction surface 40 is of cylindrical form of the same diameter as the sphere 13. The greater diameter of the portion of spherical surface is also the diameter of the sphere 13. The abutment 45 slightly closes the opening of the ring 20 above the plane 21.

Advantageously, the data input device comprises means for adjusting its brake. The adjustment means can be implemented in combination with the translational freedom of the ring 20 in the plane 21. This combination is not mandatory. Alternatively, the means for adjusting the brake already offer an advantage for a brake which would not have the translational freedom described above.

Figure 4:
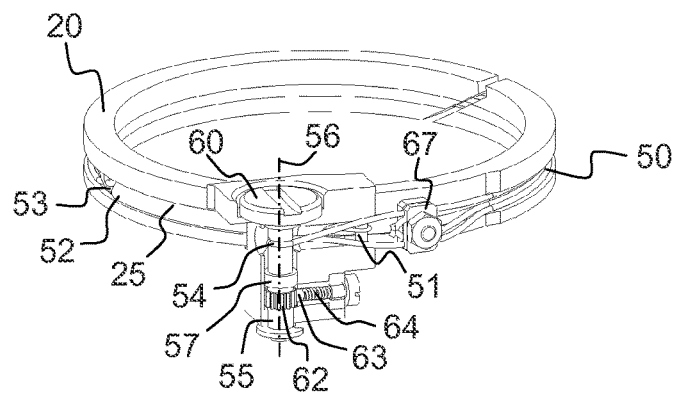
FIG. 4 shows means for adjusting a brake suited to a data input device.

FIG. 4 represents means for adjusting the resisting torque that the ring 20 exerts on the sphere 13. To avoid overloading the figure, the sphere 13 and the body 12 have been masked. The means for adjusting the brake primarily comprise a wire 50 making it possible to set the tension of the spring 25 and therefore its length defined as the length of the curve along which the spring 25 extends. The spring 25 comprises two ends 51 and 52. The end 51 is fixed to the ring 20 and the end 52 is fixed to the wire 50. The wire 50 is much more rigid than the spring 25. A variation of length of the wire 50 makes it possible to adjust the tension of the spring 25. This variation of tension is contained by the ring 20 and is translated in a variation of torque exerted by the ring 20 on the sphere 13.

Alternatively, it is possible to dispense with the wire 50. To adjust the tension of the spring 25, it is possible to directly adjust its length. To this end, the spring is, for example, formed by an elastic strip fixed to the ring 20 by its end 51 and onto a drum at its end 52. The rotation of the drum acts directly on the tension of the spring 25.

In the example represented, the annular spring 25 does not extend over a complete revolution of the axis 15. The spring 25 extends for example over an angular segment of the order of 45°. Alternatively, the spring 25 can make more than one revolution about the axis 15. The variant in which the spring extends over a reduced angular segment is however preferred in order to limit the frictions of the spring 25 against the ring 20 when adjusting the tension of the spring 25. The angular segment not covered by the spring 25 is occupied by the wire 50.

The wire 50 comprises two ends 53 and 54. The end 53 is fixed to the end 52 of the spring 25 and the end 54 is fixed to the ring 20. The adjustment of the length of the wire makes it possible to adjust the tension of the spring 25.

In order to facilitate the handling of the adjustment means by the operator, the adjustment means comprise a finger 55 that is rotationally mobile relative to the ring 20, for example about an axis 56 substantially at right angles to the plane 21. The wire 50 is wound around the finger 55 at its second end 54. More specifically, the ring 20 has a pivot link 57 partially cut away in FIG. 4. The finger 55 can turn in the pivot link 57 about the axis 56. The end 54 of the wire 50 can be fixed to the finger 55. The rotation of the finger 55 allows the wire 50 to be wound around the outer surface of the finger 55. The unwinding or winding of the wire 50 around the finger 55 respectively makes it possible to lengthen or shorten the wire 50 and therefore modify the length of the wire 50.

Other means can be implemented to secure the end 54 of the wire to the finger 55. The wire 50 can be formed from several strands, as represented in FIG. 4. The end 54 of the wire 50 can be formed by a loop joining two strands. The finger 55 is pierced at right angles to its axis of rotation 56. The loop passes through the piercing of the finger 55. The rotation of the finger 55 drives the strands forming the loop on the outer surface of the finger 55, making it possible to shorten the wire 50 to increase the tension of the spring 25.

The finger 55 advantageously comprises a head 60 intended to be maneuvered by the operator. To facilitate its maneuvering, the head 60 comprises, for example, a slot into which a coin or a tool such as a screwdriver can be inserted. It is also possible to dispense with any external object (tool or coin) by means of a suitable form of the head, such as, for example, a knurling produced on a cylindrical surface of the head, a surface that extends along the axis 56. The operator can then manipulate the knurling between his or her fingers.

Advantageously, the finger 55 can assume a number of stable angular positions about its axis 56. These various stable positions allow the tension of the spring 25 to assume a number of distinct values. These various angular positions can be obtained by adhesion in the rotation of the finger 55 in its pivot link 57. To obtain this adhesion, a flexible seal can be provided in the pivot link. This flexible seal has a break-away torque greater than the torque needed to modify the length of the wire 50. The break-away torque is determined as a function of the torque that the operator can exert on the head 60, either with a tool or with his or her fingers.

Alternatively, in the embodiment represented, the stable positions of the finger 55 about its axis of rotation 56 are predefined and obtained by a notched device. More specifically, the finger 55 can comprise notches 62 arranged angularly about the axis 56. A ball 63, thrust by a spring 64, can be inserted between the notches 62. The spring 64 can be gauged in order to set the torque that has to be applied to the finger 55 for the ball 63 to pass from one notch to the next.

Advantageously, the adjustment means comprise means for pre-tensioning the wire 50. These means make it possible to ensure a minimum tension of the wire and therefore of the spring 25. In other words, the means for adjusting the tension of the spring 25 can be used in operation allowing for the adjustment of tension within a range whose lower limit is defined by the pre-tensioning means. The pre-tensioning means can be used in the manufacturing of the data input device. The pre-tensioning means can be linked to the finger 55. More specifically, the pre-tensioning is done by fixing the second end of the wire 50 onto the finger 55.

Advantageously, to facilitate the design of the finger 55 and of its pivot link 57, the pre-tensioning means are independent of the finger 55. As represented in FIG. 4, when the wire 50 comprises a number of strands, a cable clamp 67 can be implemented away from the finger 55. The cable clamp 67 makes it possible to tighten the strands forming the wire 50.

Figure 5:
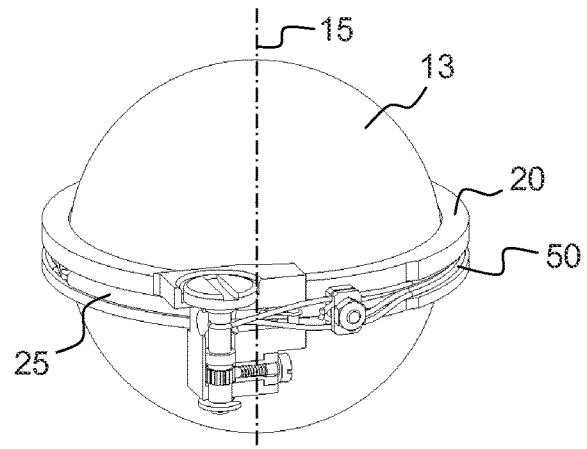
FIG. 5 shows the means of FIG. 4 implemented in the track ball.

FIG. 5 again represents the track ball 10. The means for adjusting the tension of the spring 25 described with the help of FIG. 4 again appear.

Figure 6:
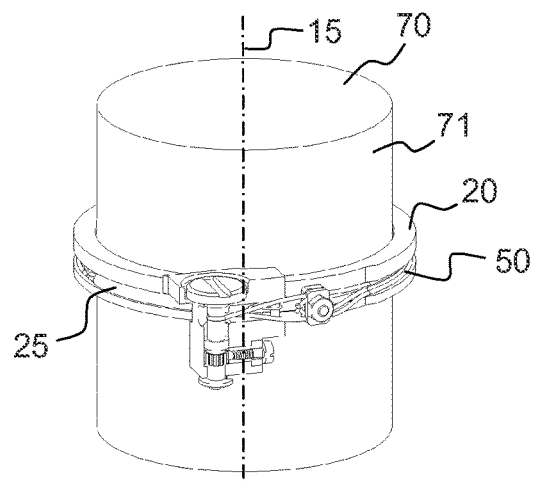
FIG. 6 shows the means of FIG. 4 implemented in a data input device, of which the mobile part is a shaft that is mobile solely by rotation.

FIG. 6 represents the means for adjusting the tension of the spring 25 described with the help of FIG. 4 and implemented in a data input device whose mobile part is a shaft 70 mobile solely by rotation about the axis 15. The shaft 70 comprises a cylindrical surface 71 on which the ring 20 rubs. The cylindrical surface 71 extends along the axis 15. This data input device makes it possible to enter a datum as a function of the angular position of the shaft 70 about the axis 15. The angular position is for example translated into electrical information by means of a potentiometer or an optical coder.

The invention claimed is:

1. A data input device comprising:
   a body configured to be fixed onto a workstation;
   a mobile part rotationally mobile relative to the body;
   a set of sensors configured to deliver information on a relative position of the mobile part in relation to the body;
   braking means for braking rotational movement of the mobile part in relation to the body, the braking means comprising:
   a friction ring, encircling the mobile part, the friction ring being split and extending mainly in a plane at right angles to an axis of symmetry of the mobile part,
   an annular spring extending in the plane and radially compressing the friction ring against the mobile part,
   wherein the annular spring comprises two ends, a first of the two ends being fixed to the friction ring, and
   adjustment means for adjusting a length of the annular spring during operation of the data input device,
   wherein the adjustment means comprises a wire of adjustable length comprising two ends, a first of the two ends of the wire is fixed to a second of the two ends of the annular spring, and the second of the two ends of the wire is fixed to the friction ring.

2. The data input device according to claim 1,
   wherein the adjustment means comprises a finger that is rotationally mobile relative to the friction ring, and
   wherein the wire is wound around the finger at its second end.

3. The data input device according to claim 2, wherein the rotation of the finger takes place about an axis substantially at right angles to the plane.

4. The data input device according to claim 2,
   wherein the finger is configured to rotate about an axis, and
   wherein the finger can assume a number of stable angular positions predefined about its axis.

5. The data input device according to claim 1, wherein the adjustment means comprises a pre-tensioning means for pre-tensioning the wire.

6. The data input device according to claim 5,
   wherein the pre-tensioning means is independent of the finger,
   wherein the adjustment means comprises a finger that is rotationally mobile relative to the friction ring, and
   wherein the wire is wound around the finger at its second end.

7. The data input device according to claim 1, wherein the friction ring is translationally free in relation to the body in the plane in which the friction ring extends.

8. The data input device according to claim 1, wherein the mobile part comprises a track ball.

9. The data input device according to claim 1,
   wherein the mobile part is a shaft that is mobile solely by rotation about the axis, and
   wherein the shaft comprises a cylindrical surface extending along the axis and on which the friction ring rubs.

* * * * *